Oct. 4, 1966  E. C. DOME  3,276,736
SEAT WITH FLUID SPRING
Original Filed Dec. 5, 1963  2 Sheets-Sheet 1
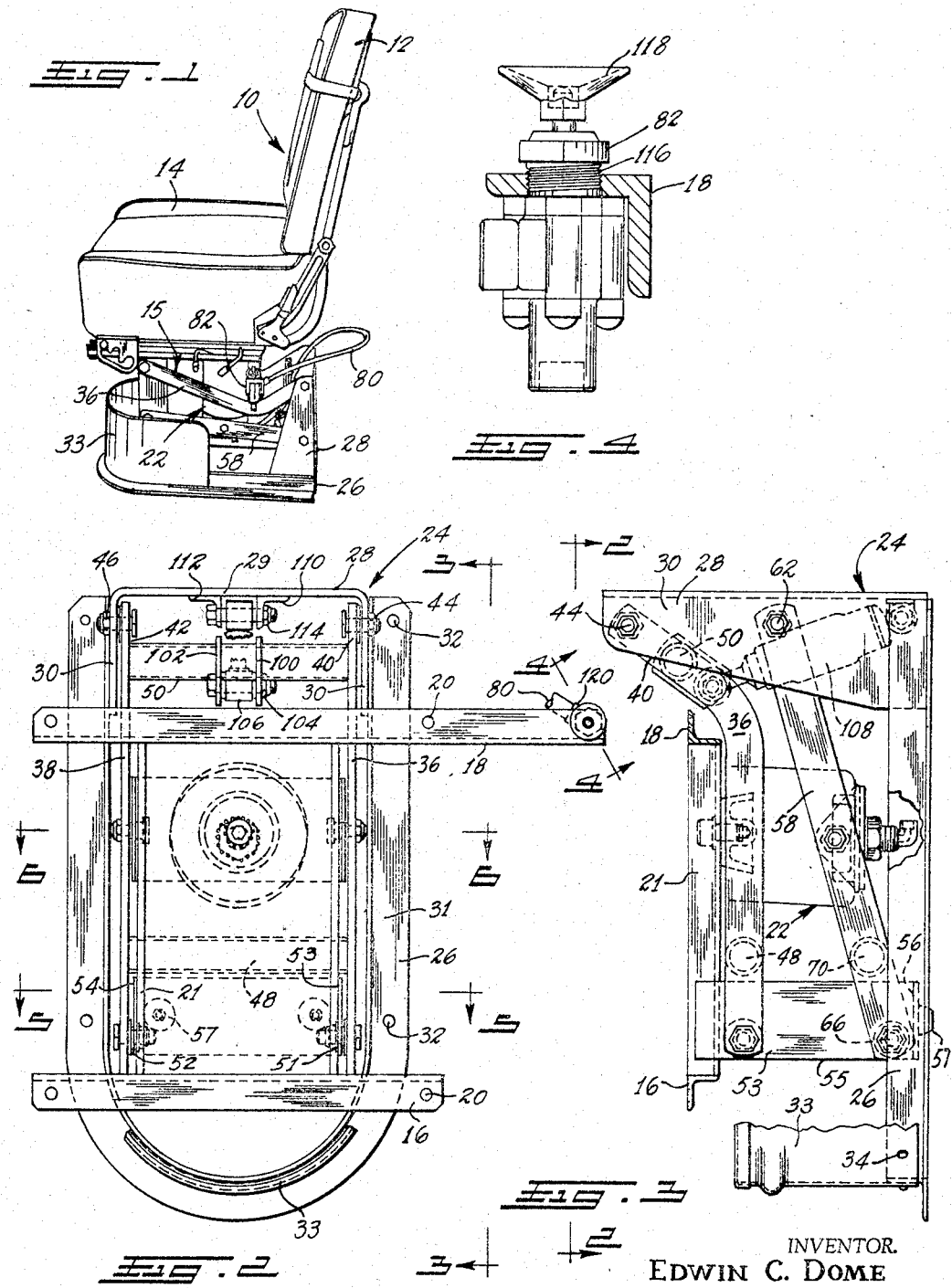
INVENTOR.
EDWIN C. DOME
BY
Oberlin, Maky & Donnelly
attorneys Oct. 4, 1966     E. C. DOME     3,276,736
SEAT WITH FLUID SPRING
Original Filed Dec. 5, 1963     2 Sheets-Sheet 2
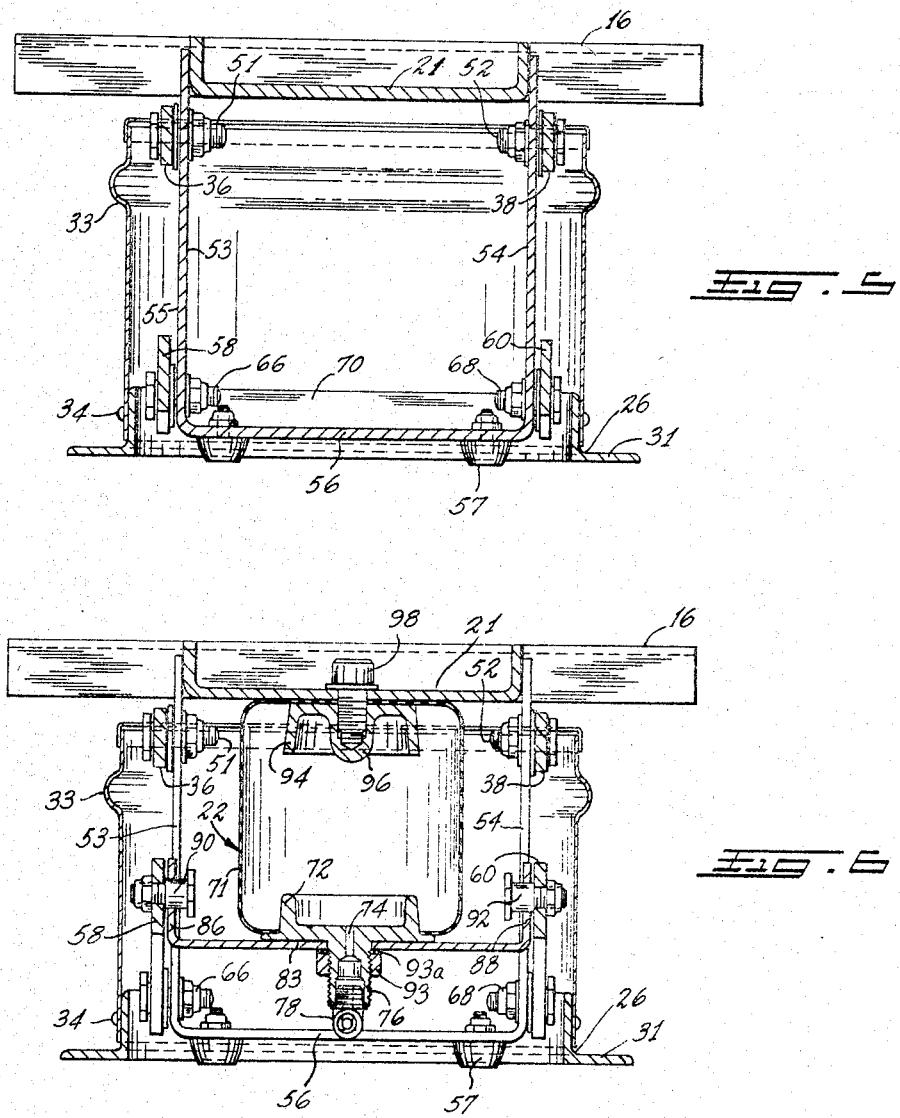
INVENTOR.
EDWIN C. DOME
BY
Oberlin, Maky & Donnelly
attorneys

United States Patent Office 3,276,736
Patented Oct. 4, 1966

3,276,736
SEAT WITH FLUID SPRING
Edwin C. Dome, Lucas, Ohio, assignor to Artnell Company, Chicago, Ill., a corporation of Delaware
Continuation of application Ser. No. 328,375, Dec. 5, 1963. This application July 26, 1965, Ser. No. 477,646
4 Claims. (Cl. 248—400)

This application is a continuation of my earlier application Serial No. 328,375, filed December, 5, 1963, now abandoned, and entitled, "Seat with Fluid Spring."

The present invention relates in general to seats and more particularly to seats having fluid spring support, the term "fluid spring" being commonly referred in the art and herein to designate any expansible housing or the like defining a sealed chamber for receiving fluid under pressure, the degree of expansion of such housing being dependent upon such fluid pressure.

Seats having supporting means completely or partially in the form of fluid springs find advantageous use in transportation seating environments such as, e.g., driver's seats in buses and like vehicles. The fluid spring provides a relatively smooth ride when compared to the conventional coil spring supporting structure, and permits adjustment to satisfy individual needs or desires. The fluid spring in present arrangements is generally connected at one end to the vertically movable seat and the other end thereof is fixed to a stationary mounting assembly or the like for the seat, whereby the range of vertical adjustment of the seat is limited to the range of resilient expansibility of the fluid spring itself.

It is a primary object of the present invention to overcome this limitation as to the range of vertical adjustment of the seat by providing a novel means for mounting the opposed ends of the fluid spring to permit a substantially greater range of adjustment for the seat when compared to present arrangements.

A more specific object of the present invention is to provide a novel means for mounting the fluid spring to effect simultaneous movement of both ends thereof thereby to substantially increase the vertical range of adjustment of the seat while maintaining the fluid spring itself within present ranges of resilient expansibility.

A further object of the present invention is to provide a fluid spring support assembly which is highly simplified and rugged in construction and which is provided with control means readily accessible at one side of the assembly for vertically adjusting the seat.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a seat operatively associated with the fluid spring support of the present invention;

FIG. 2 is a top plan view of the seat support assembly, including the fluid spring with the seat having been removed to expose the assembly parts;

FIG. 3 is a side elevational view taken on lines 3—3 of FIG. 2, with certain portions being broken away;

FIG. 4 is an enlarged view of the fluid control valve, taken on lines 4—4 of FIG. 2;

FIG. 5 is a sectional view taken on lines 5—5 of FIG. 2; and

FIG. 6 is a sectional view taken on line 6—6 of FIG. 2.

Referring now more specifically to the drawings, wherein like reference characters are used to designate like parts, and initially to FIG. 1, there is illustrated therein a seat generally indicated at 10 of conventional construction comprising a rear or back cushion 12 and a bottom cushion 14. The seat 10 itself forms no part of the present invention and has been illustrated to show by way of example one type of equipment with which the fluid spring support of the present invention can be advantageously employed. The seat 10 is illustrative of a driver's seat in a vehicle such as, for example, a bus, but it should be understood, and it will become more apparent as the description proceeds, that the fluid spring support assembly of the present invention could be employed with equal advantage with other equipment and in other environments.

To secure the seat 10 to the support assembly generally indicated at 15, the latter is provided with a movable seat-supporting frame comprising horizontally spaced support brackets 16 and 18, both of which are generally L-shaped in cross-section and provided with openings commonly indicated at 20 through which suitable securing means (not shown) may extend for rigidly securing the seat 10 thereto. The movable frame further includes a generally U-shaped connecting plate 21 disposed between and secured at opposite ends to the brackets 16 and 18, thus to form therewith a unitary frame for the seat 10. The movable frame, and thus the seat 10 secured thereto, are vertically adjustable through regulation of the pressure within the fluid spring generally indicated at 22, as will be hereinafter described.

The support assembly 15 further includes a stationary base frame assembly generally indicated at 24 comprising a generally U-shaped base member 26 of L-shaped cross-section and an upright frame member 28 rigidly secured thereto, the latter including a rear wall 29 and side walls 30 extending normal thereto. The horizontally disposed flange 31 of the base member 26 is provided with spaced openings 32 through which securing means (not shown) may extend for mounting the assembly 24 to the supporting surface. A shroud 33 is secured to the base 26 by sheet metal fasteners 34, for example, and extends part way around the base member 26 for partially enclosing the support assembly.

Referring now to the means by which the seat 10 is vertically adjustably mounted relative to the stationary base frame assembly 24, upper arms 36 and 38 are disposed at both sides of such base frame assembly and are provided with upwardly inclined rear end portions 40 and 42, respectively, which are pivotally mounted to the sides of the upright frame member 28 through pivot pin connections 44 and 46, respectively. Transverse tubular support members 48 and 50 are disposed between and secured to the arms 36 and 38 relatively adjacent the front and rear end portions thereof, respectively, to form a rigid upper arm assembly. The forward ends of the arms 36 and 38 are pivotally connected through pivot pin connections 51 and 52, respectively, to the side plates 53 and 54 of a vertically movable front support member 55, the latter further including an integral bottom web section 56. The side plates 53 and 54 are secured at their upper ends to the opposite side of the U-shaped connecting plate 21 which forms part of the movable frame, and thus the front support member 55 is movable therewith. Preferably rubber bumpers 57 are mounted on the web 56 for supporting the support member 55 when the latter is in its lower position. As best shown in FIGS. 5 and 6, the upwardly directed sides of the connecting plate 21 terminate preferably in the same plane as the top of the brackets 16 and 18 to prevent the flat surface for mounting the seat 10.

A pair of lower arms 58 and 60 are disposed below and preferably in the plane of the upper arms 36 and 38, each of the lower arms 58 and 60 being similarly pivotally connected to the upright frame member 28 through pivot pin connections 62. The lower arms 58 and 60 are pivotally connected to the side plates 53 and 54 through respective pivot pin connections 66 and 68 whereby vertical movement of the front support member 55 will thereby effect rotation of the lower arms 58 and 60 about the axis through their pivot pin connections 62 with the upright frame member 28. A transversely extending tubular support member 70 is disposed between and connected to the lower arms 58 and 60 for rigidly interconnecting the same.

As best shown in FIG. 6, the fluid spring 22 previously referred to comprises an elastomeric housing or membrane 71 the lower open end of which is secured to a bottom coupling 72. The coupling 72 is generally cup-shaped and is formed with a central passage 74 through which fluid can be supplied to the interior of the fluid spring. An externally threaded stem 76 extends downwardly from the body portion of the coupling 72, such stem being centrally bored and internally threaded for receiving fitting 78. The opposite end of the fitting 78 is in turn adapted to receive the end of a flexible fluid supply tube 80, FIG. 1, the opposite end of such tube being connected to control valve 82 for regulating the fluid pressure within the fluid spring 22.

The coupling 72 is supported by a transversely extending plate 83 having upwardly directed opposite end portions 86 and 88 pivotally connected to the lower arms 58 and 60, respectively, through pivot pin connections 90 and 92, respectively. The plate 83 is centrally apertured for receiving therethrough the stem 76 of the coupling 72, and the coupling 72 is clamped to such plate by nut means 93 and lock washer 93a.

The upper end of the fluid spring 22 is secured to an upper coupling member 94 which abuts the bottom surface of the plate 21, the coupling being provided with a downwardly depending, centrally disposed nipple 96 which is internally bored and threaded for receiving a cap screw 98. It will be seen that tightening of the cap screw 98 will securely clamp the coupling 94 and the upper end of the fluid spring to the connecting plate 21.

Securely mounted in spaced relation on the transverse tubular member 50 are rectangular support brackets 100 and 102, FIG. 2. The support brackets are apertured for receiving a pivot pin connection 104 for pivotally supporting the upper end 106 of a chock absorber 108. The bottom end of the shock absorber 108 is secured to the vertical upright frame member 28 by means of apertured mounting brackets 110 and 112 rigidly secured thereto, such bottom end of the shock absorber extending between the spaced mounting brackets and being pivotally connected relative thereto by means of a pivot pin connection 114. The construction and function of the shock absorber 108 is conventional and forms no part of the present invention, serving in its usual capacity to dampen downward vertical movement of the seat 10.

The air control valve 82 is mounted on the extreme outer end of bracket 18 for convenient access and comprises, referring to FIG. 4, a threaded neck portion 116 receivable within a threaded bore formed in the bracket 18 adjacent the end thereof. A dish-shaped, depressible end portion 118 is threaded on the intermediate section 116, the end 118 being adapted to receive a suitable fluid supply device (not shown). An internal passageway (not shown) extends from such end 118 to a nipple 120, FIG. 2, extending outwardly from a side of the valve, and the flexible tube 80 is connected to the control valve 82 at the nipple 120. The control valve 82 thus accommodates in a well-known manner the supply of air to the fluid spring 22 to inflate the same or the deflating thereof so as to achieve the desired fluid pressure therewithin.

The manner in which the seat 10 can be vertically adjusted should be apparent from the above description. Presuming the fluid spring 22 is in its deflated condition, such condition being shown in FIG. 3, the entire supporting assembly is supported directly upon the supporting surface by the bumpers 57 mounted on the bottom of the front support 55. When it is desired to raise the seat 10, fluid is supplied through valve 82 to the fluid spring 22, thereby causing the elastomeric housing thereof to resiliently expand. Since the bottom of the fluid spring 22 is in its lowest position and prevented from further downward movement, the upper end thereof will expand thereby elevating the movable frame comprising brackets 16 and 18 and plate 21, and the seat 10 mounted thereto. The raising of the connecting plate 21 will effect raising of the front support member 55, and upper and lower arms 36, 38 and 58, 60, respectively, pivotally mounted on the side plates 53 and 54. The upper and lower arms will rotate about their respective pivot axes through the pivotal connections thereof with the upright frame member 28.

Through the connection of the arms 58 and 60 with the transverse plate 83, as the seat 10 is thus vertically raised, the lower portion of the fluid spring 22 will also be raised. The extent to which the lower portion of the fluid spring 22 is raised depends upon, and can thus be controlled by, the distance from the pivotal mounting of transverse plate 83 to the upright frame member 28, and more particularly the distance to the axis through the pivotal pin connections 62. Thus, the height of the seat 10 can be regulated by varying the fluid pressure within the expansible fluid spring 22.

The vertically movable mounting of both ends of the fluid spring thus distinguish the present invention from known fluid spring arrangements which mount the bottom of the fluid spring directly to the stationary base and thereby limit the extent of vertical adjustment of the seat to the resilient expansibility of the fluid spring itself. The present invention, on the other hand, enables the seat to be raised a substantial distance in excess of the range of expansibility of the fluid spring, by virtue of vertical movement of the lower mounting thereof. By way of example only and without limitation in any way intended, one employed form of the fluid spring support of the present invention enables the seat to be raised approximately 7″ while the fluid spring is extended only approximately 3½″. Thus, the present invention enables a significantly greater range of vertical adjustment of the seat with existing fluid spring structures. The fluid spring support is further characterized by its structural simplicity and access to the means for controlling the fluid pressure within the fluid spring.

Other modes of applying the principle of the invention may be employed, change being made as regards the details described, provided the features stated in any of the following claims or the equivalent of such be employed.

I therefore particularly point out and distinctly claim as my invention:

1. A fluid spring support assembly for vertically adjustably supporting a seat or the like comprising a stationary base frame assembly, a movable, generally horizontal seat frame vertically movable relative to said base frame assembly and adapted to mount such seat, a pair of upper arms pivotally mounted on said base frame assembly and operatively connected to said movable seat frame, a pair of lower arms pivotally mounted on said base frame assembly and operatively connected to said movable seat frame, resiliently expansible fluid spring means provided with an elastomeric housing, said spring means having an upper end connected to said movable seat frame and a lower end operatively connected to said pair of lower arms, and valve means for controlling the fluid pressure within said fluid spring and thereby control the vertical adjustment of said seat frame.

2. The combination of claim 1 wherein said lower end of said fluid spring means is operatively connected to said lower arm means through a transverse plate mounting said lower end of said spring, said transverse plate being provided with opposite end portions pivotally connected respectively to each of said lower arms, with such pivotal connections permitting said transverse plate, and said lower end of said spring means mounted thereon, to remain generally horizontal in the vertical adjustment of said movable seat frame.

3. The combination of claim 2 wherein said pivotal connections of said transverse plate to said lower arms is generally intermediate the ends of the latter thereby affording a vertical range of adjustment of said seat frame approximately twice the expansibility of said fluid spring.

4. The combination of claim 1 further including shock absorber means operatively connected at opposite ends thereof to said upper pair of arms and to said stationary base frame assembly for dampening the vertical movement of said seat frame.

References Cited by the Examiner

UNITED STATES PATENTS

| | | | |
|---|---|---|---|
| 2,829,703 | 4/1958 | Knoedler | 248—400 |
| 3,150,855 | 9/1964 | Carter et al. | 248—400 |

CLAUDE A. LE ROY, *Primary Examiner.*

J. F. FOSS, *Assistant Examiner.*